US010760772B2

(12) United States Patent
Nishio et al.

(10) Patent No.: US 10,760,772 B2
(45) Date of Patent: Sep. 1, 2020

(54) ILLUMINATION DEVICE

(71) Applicant: DAI NIPPON PRINTING CO., LTD., Tokyo (JP)

(72) Inventors: Shumpei Nishio, Tokyo (JP); Makio Kurashige, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 247 days.

(21) Appl. No.: 15/762,122

(22) PCT Filed: Sep. 23, 2016

(86) PCT No.: PCT/JP2016/078011
§ 371 (c)(1),
(2) Date: Mar. 22, 2018

(87) PCT Pub. No.: WO2017/051868
PCT Pub. Date: Mar. 30, 2017

(65) Prior Publication Data
US 2018/0259157 A1    Sep. 13, 2018

(30) Foreign Application Priority Data

Sep. 25, 2015    (JP) .................................. 2015-188316

(51) Int. Cl.
*F21V 9/40* (2018.01)
*F21V 9/08* (2018.01)
(Continued)

(52) U.S. Cl.
CPC .................. *F21V 9/40* (2018.02); *F21V 9/00* (2013.01); *F21V 9/08* (2013.01); *G02B 3/00* (2013.01);
(Continued)

(58) Field of Classification Search
CPC ..... F21V 9/40; F21V 9/00; F21V 9/08; G02B 3/00; G02B 3/0006; G02B 5/32; G02B 26/10; G02B 27/48
See application file for complete search history.

(56) References Cited

U.S. PATENT DOCUMENTS

2002/0075776 A1*  6/2002  Kasazumi ................ G03H 1/22
                                                            369/47.5
2006/0033009 A1    2/2006  Kobayashi et al.
(Continued)

FOREIGN PATENT DOCUMENTS

JP    H10-239687 A    2/1997
JP    2011-043603 A   3/2011
(Continued)

OTHER PUBLICATIONS

English Machine Translation of Makio JP 2015-132707. Jan. 14, 2014. (Year: 2014).*
(Continued)

*Primary Examiner* — Evan P Dzierzynski
(74) *Attorney, Agent, or Firm* — Michael Best & Friedrich LLP (57) ABSTRACT

The illumination device capable of illuminating plural regions via a light diffusion element includes a laser light source that emits a laser beam, an optical scan unit capable of changing an optical path of the laser beam from the laser light source, an optical path adjustment element and a light diffusion element. On the optical path adjustment element, the laser beam from the optical scan unit is incident, an incidence position of the laser beam varies depending on the optical path determined by the optical scan unit; and an emission angle of the laser beam varies depending on the incidence position. The light diffusion element diffuses the laser beam and emits diffused light. On the light diffusion element, the laser beam from the optical path adjustment
(Continued)

element is incident and an emission angle of the diffused light varies depending on an incidence angle of the laser beam.

12 Claims, 3 Drawing Sheets

(51) Int. Cl.
    *G02B 5/32*     (2006.01)
    *G02B 26/10*     (2006.01)
    *G02B 27/48*     (2006.01)
    *F21V 9/00*     (2018.01)
    *G02B 3/00*     (2006.01)

(52) U.S. Cl.
    CPC ............ *G02B 3/0006* (2013.01); *G02B 5/32* (2013.01); *G02B 26/10* (2013.01); *G02B 27/48* (2013.01)

(56) References Cited

U.S. PATENT DOCUMENTS

| | | | | |
|---|---|---|---|---|
| 2007/0258343 A1* | 11/2007 | Jung | ................ | G11B 7/00781 369/103 |
| 2008/0198429 A1* | 8/2008 | Uno | ................ | G03H 1/04 359/21 |
| 2009/0052300 A1* | 2/2009 | Tokuchi | ................ | G03H 1/26 369/103 |
| 2011/0043876 A1 | 2/2011 | Kurashige et al. | | |
| 2013/0077057 A1 | 3/2013 | Kurashige et al. | | |
| 2015/0085518 A1 | 3/2015 | Kurashige et al. | | |
| 2016/0313567 A1* | 10/2016 | Kurashige | ............ | G03B 21/208 |

FOREIGN PATENT DOCUMENTS

| | | |
|---|---|---|
| JP | 2012-226272 A | 11/2012 |
| JP | 2015-132707 A | 1/2014 |
| JP | 2014-186328 A | 10/2014 |
| WO | 2012/033174 A1 | 3/2012 |

OTHER PUBLICATIONS

International Search Report dated Nov. 22, 2016 for the corresponding International Application No. PCT/JP2016/078011.

International Preliminary Report and English translation of Written Opinion of the International Searching Authority dated Nov. 22, 2016 for corresponding International Application No. PCT/JP2016/078011.

Chinese Office Action dated Sep. 25, 2019 for the corresponding Chinese Patent Applicatimi No. 201680055066.8, with English translation.

European search report dated Mar. 21, 2019 for the corresponding European application No. 16848656.1.

Japanese Office Action dated Apr. 17, 2020 for the corresponding Japanese Patent Application No. 2017-541587, with English machine translation.

\* cited by examiner

ILLUMINATION DEVICE

CROSS-REFERENCE TO RELATED APPLICATIONS

This application is entering into national phase of PCT Application No. PCT/JP2016/078011, filed on Sep. 23, 2016, which claims the priority from Japanese Patent Application No. 2015-188316, filed on Sep. 25, 2015 in the Japanese Patent Office. The entire contents of which are hereby incorporated by reference into this application.

TECHNICAL FIELD

The present invention relates to an illumination device that illuminates a prescribed range by using a coherent light.

BACKGROUND ART

Illumination devices employing a laser light source are becoming prevalent since the laser light source is long-life compared to high-pressure mercury lamps and the like, the optical system can be downsized, and the electric power consumption is lower. Especially, by combining a laser light source with a light diffusion element such as a hologram, it is possible to illuminate a particular region with light having directivity and a breadth.

For example, Patent Document 1 discloses an illumination device that illuminates an illumination object region with a coherent light such as a laser beam diffused by a hologram record medium. Patent Document 2 discloses a display device including a transmissive hologram having a plurality of regions to which reconstructed images different from each other are respectively assigned and being capable of making a laser beam be incident on each region of the transmissive hologram and thereby projecting the assigned hologram reconstructed image onto a road surface.

CITATION LIST

Patent Literature

Patent Document 1: WO 2012/033174
Patent Document 2: JP-A-2015-132707

SUMMARY OF INVENTION

Technical Problem

While devices applying a coherent light to an intended region via a hologram are known as described above, in such devices, the irradiation position of the coherent light on the hologram corresponds to the position of illumination by the diffused light emerging from the hologram in a one-to-one correspondence.

For example, Patent Document 1 discloses a hologram record medium having three record regions respectively corresponding to a red coherent light, a blue coherent light and a green coherent light. The red, blue and green coherent lights are respectively incident on the corresponding record regions different from each other. In this device, while the irradiation position of the coherent light on the hologram record medium is controlled by a scan device, in regard to the same irradiation position on the hologram record medium, the coherent light is incident on the hologram record medium at the same angle and thereafter emerges from the hologram record medium at the same angle and illuminates the same place in the illumination object region. Patent Document 1 also discloses an optical element including three hologram record media. These three hologram record media are respectively associated with three illumination object regions different from each other, and the coherent light illuminates an illumination object region associated with the hologram record medium on which the coherent light is incident. Also in this device, while the coherent light scans on each hologram record medium, in regard to the same irradiation position on the hologram record medium, the coherent light is incident on the hologram record medium at the same angle and thereafter emerges from the hologram record medium at the same angle and illuminates the same place in the illumination object region.

In the display device of Patent Document 2, a laser beam is incident on a transmissive hologram via a mirror and a hologram reconstructed image corresponding to the incidence position of the laser beam on the transmissive hologram is projected onto the road surface. In this device, while the irradiation position of the laser beam on the transmissive hologram is controlled by the mirror, in regard to the same irradiation position on the transmissive hologram, the laser beam is incident on the transmissive hologram at the same angle and thereafter emerges from the transmissive hologram at the same angle and illuminates the same place on the road surface.

In such cases where a plurality of different regions are illuminated with an "illumination device having a one-to-one correspondence between the irradiation position of the coherent light on the hologram and the illumination position of the diffused light emerging from the hologram," it is necessary to prepare a hologram region for each illumination region. Namely, it is necessary to place a plurality of hologram regions, corresponding respectively to a plurality of illumination regions, on the optical path of the coherent light and to guide the coherent light to a hologram region associated with an intended region in cases of illuminating the intended region.

Therefore, in order to illuminate a plurality of different regions with an "illumination device having a one-to-one correspondence between the irradiation position of the coherent light on the hologram and the illumination position of the diffused light emerging from the hologram," it is necessary to provide as many different hologram regions as the illumination regions. Thus, in cases where the number of presumed illumination regions is large, the number of the hologram regions also becomes large, the device configuration becomes complicated, and the total size of the hologram regions increases. Accordingly, in cases such as a case where the installation space for the hologram is limited, the "illumination device having a one-to-one correspondence between the irradiation position of the coherent light on the hologram and the illumination position of the diffused light emerging from the hologram" is not necessarily desirable, and an illumination device equipped with a hologram having a simpler and compact configuration is desirable.

An object of the present invention, which has been made in consideration of the above-described situation, is to provide an illumination device capable of illuminating a plurality of regions via a light diffusion element such as a hologram that has a simple configuration and can be configured compactly.

Solution to Problem

An aspect of the present invention is directed to an illumination device comprising: a coherent light source which emits a coherent light; an optical scan unit which is capable of changing an optical path of the coherent light from the coherent light source; an optical path adjustment element on which the coherent light from the optical scan unit is incident, an incidence position of the coherent light of the optical path adjustment element varying depending on the optical path determined by the optical scan unit, an emission angle of the coherent light of the optical path adjustment element varying depending on the incidence position; and a light diffusion element on which the coherent light from the optical path adjustment element is incident, the light diffusion element diffusing the coherent light and emitting diffused light, an emission angle of the diffused light varying depending on an incidence angle of the coherent light.

According to this aspect, by making the optical scan unit change the incidence position of the coherent light on the optical path adjustment element, the emission angle of the diffused light from the light diffusion element can be controlled and a plurality of regions can be illuminated with the diffused light emerging from a single light diffusion element and varying in the emission angle. As above, a plurality of regions can be selectively illuminated via a light diffusion element that can be configured simply and compactly.

The optical path adjustment element may make the coherent light be incident on a particular range of the light diffusion element irrespective of the incidence position of the coherent light from the optical scan unit.

According to this aspect, the incidence angle of the coherent light on the light diffusion element can be changed according to the emission angle of the coherent light from the optical path adjustment element.

The light diffusion element may emit the diffused light having a diffusion angle larger than a diffusion angle of the coherent light incident thereon.

According to this aspect, each region of the illumination object having a breadth can be appropriately illuminated with the diffused light from the light diffusion element.

The optical path adjustment element may be formed of a single optical element.

According to this aspect, the illumination device can be configured simply.

The optical path adjustment element may be formed of a plurality of optical elements.

According to this aspect, the optical path adjustment element can be designed flexibly.

The optical path adjustment element may include a collimating optical element and a condensing optical element.

According to this aspect, it is possible to make a collimated and condensed coherent light be incident on the light diffusion element.

The light diffusion element may be a hologram record medium.

The light diffusion element may include a lens array having a plurality of lenses.

The optical path adjustment element may make a beam diameter of the coherent light emitted from the optical path adjustment element larger than a beam diameter of the coherent light incident on the optical path adjustment element.

A beam diameter of the coherent light traveling from the optical scan unit towards the optical path adjustment element may be constant.

A beam diameter of the coherent light traveling from the optical scan unit towards the optical path adjustment element may change.

The illumination device may be configured as below:

The coherent light whose optical path may be changed by the optical scan unit contains light components having wavelengths different from each other, a spectroscopic unit may be provided between the optical path adjustment element and the light diffusion element, the coherent light from the optical path adjustment element may be incident on the light diffusion element via the spectroscopic unit, and the spectroscopic unit spectrally may disperse the coherent light from the optical path adjustment element into a plurality of light components having wavelengths different from each other and emits the plurality of light components towards the light diffusion element.

The spectroscopic unit may include: a first spectroscopic guide member that allows a light component in a first wavelength range to pass therethrough and guides the light component to the light diffusion element while reflecting light components in other wavelength ranges; and a second spectroscopic guide member that guides the light components in the other wavelength ranges reflected by the first spectroscopic guide member to the light diffusion element.

Advantageous Effects of the Invention

According to the present invention, by making the optical scan unit change the incidence position of the coherent light on the optical path adjustment element, the emission angle of the diffused light from the light diffusion element can be controlled and a plurality of regions can be illuminated via the light diffusion element that can be configured simply and compactly.

DESCRIPTION OF EMBODIMENTS

An embodiment of the present invention will be described below with reference to drawings. In the accompanying drawings, the reduction scale, the aspect ratio between horizontal and vertical dimensions, etc. are properly exaggerated or modified from those of the actual object for convenience of illustration and easy understanding.

Further, terms used in this description for specifying a shape, geometric condition or the degree of the shape or geometric condition, such as "parallel," "orthogonal" and "same," and values of length, angle, etc. in this description are not to be limited to their strict senses but to be interpreted to include a range within which an equivalent function can be expected.

Figure 1:
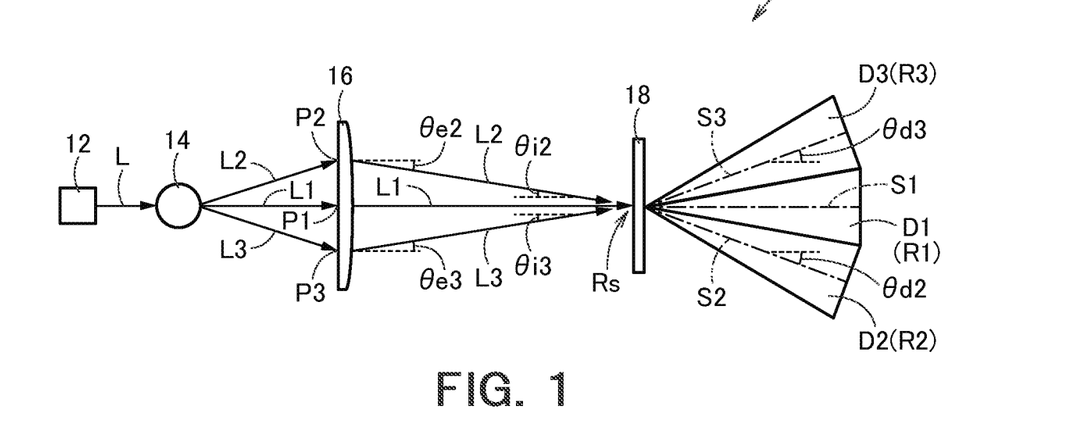
FIG. 1 is a conceptual diagram showing the general configuration of an illumination device according to an embodiment of the present invention.

FIG. 1 is a conceptual diagram showing the general configuration of an illumination device 10 according to an embodiment of the present invention.

In the illumination device 10 according to this embodiment, a laser light source (coherent light source) 12, an optical scan unit 14, an optical path adjustment element 16 and a light diffusion element 18 are arranged successively.

The laser light source 12 is a light source that emits a laser beam (coherent light) L. Typically, a semiconductor laser light source is usable as the laser light source 12. The number of light sources constituting the laser light source 12 can either be one or more than one. In cases where the laser light source 12 is constituted of a plurality of light sources, wavelength ranges of the laser beams L emitted from the plurality of light sources may either be the same as each other or different from each other. In order to increase the emission intensity of the laser beams L emitted from the laser light source 12, the wavelength ranges of the laser beams L emitted from the plurality of light sources are desired to overlap with each other. In cases where the wavelength ranges of the laser beams L emitted from the plurality of light sources constituting the laser light source 12 differ from each other, the plurality of light sources may either be provided independently of each other or arranged on a common substrate to form a light source module. For example, in cases where the plurality of light sources constituting the laser light source 12 are capable of emitting laser beams L in a red wavelength range, a green wavelength range and a blue wavelength range, it is also possible to generate white illuminating light by superimposing the three types of laser beams L together.

Incidentally, the laser light source 12 includes a light emission control unit (not shown) that controls the emission of the laser beam L. The light emission control unit is controlled by a light emission timing control unit 27 (see FIG. 3) which will be described later. For example, the light emission control unit may control the light emission timing of a plurality of laser beams, differing from each other in the emission wavelength range, separately and independently of each other. Namely, in cases where a plurality of light sources are provided corresponding to a plurality of laser beams differing from each other in the emission wavelength range, the light emission control unit can control the light emission timing, for making the plurality of light sources emit the laser beams, in regard to each of the light sources. Thus, in cases where the laser light source 12 is capable of emitting three laser beams of red, green and blue, the control of the emission timing of each laser beam makes it possible to generate illuminating light of an intended color selected from red, green and blue, or illuminating light of a color as a mixture of two or more intended colors selected from red, green and blue. The light emission control unit may also control the emission intensity of the laser beam in each light source and can also make each light source emit a laser beam of high emission intensity or a laser beam of low emission intensity.

The optical scan unit 14 is capable of changing the optical path of the laser beam L from the laser light source 12, guiding the laser beam L from the laser light source 12 to the optical path adjustment element 16, and scanning the laser beam L on the optical path adjustment element 16. Especially, in this embodiment, the final illumination region changes depending on the incidence position of the laser beam L on the optical path adjustment element 16 as will be explained later, and thus the illumination region is changed by making the optical scan unit 14 adjust the optical path and change the incidence position of the laser beam L on the optical path adjustment element 16. Incidentally, while three types of laser beams (a first laser beam L1, a second laser beam L2 and a third laser beam L3) undergoing the change of the optical path by the optical scan unit 14 and incident on different positions on the optical path adjustment element 16 (an incidence position P1, an incidence position P2 and an incidence position P3) are illustrated in FIG. 1, the incidence positions of the laser beam are not limited to these three positions; the optical scan unit 14 is capable of guiding the laser beam to an intended position on the optical path adjustment element 16 and making the laser beam be incident on the position.

Such an optical scan unit 14 may have any type of configuration as long as the unit is capable of adjusting the optical path of the laser beam L under the control of an optical scan control unit 28 (see FIG. 3) which will be described later. For example, the optical scan unit 14 can be simply configured by using a mirror or the like, such as a polygon mirror, a biaxial galvanometer mirror, a MEMS (Micro Electro Mechanical Systems) mirror such as a resonance mirror, or a large-diameter biaxial resonance mirror having a reflecting surface of some tens of millimeters (mm) in diameter.

The optical path adjustment element 16 receives the laser beam L incident from the optical scan unit 14 and emits the laser beam L towards a particular range Rs of the light diffusion element 18. The incidence position of the laser beam L on the optical path adjustment element 16 (see the reference characters "P1," "P2" and "P3" in FIG. 1) varies depending on the optical path of the laser beam L determined by the optical scan unit 14, and the emission angle of the laser beam L from the optical path adjustment element 16 varies depending on the incidence position of the laser beam L on the optical path adjustment element 16. FIG. 1 illustrates the "emission angle θe2 of the second laser beam L2" and the "emission angle θe3 of the third laser beam L3" with reference to the optical axis of the optical path adjustment element 16, for example. Incidentally, the emission angle (θe1) of the first laser beam L1, traveling in the direction parallel to the optical axis of the optical path adjustment element 16 and on the optical axis, with reference to the optical axis of the optical path adjustment element 16 is 0 degrees.

The optical path adjustment element 16 functioning as a transfer optical element makes the laser beam L be incident on a particular range (see the reference character "Rs" in FIG. 1) of the light diffusion element 18 irrespective of the incidence position of the laser beam L from the optical scan unit 14. Accordingly, all of the aforementioned first laser beam L1, second laser beam L2 and third laser beam L3 emerging from the optical path adjustment element 16 are incident on the particular range Rs on the light diffusion element 18. The specific position and size of the particular range Rs on the light diffusion element 18 mentioned here are not particularly limited; the "particular range Rs" is formed by spots on the light diffusion element 18 that has a deflective light diffusion function of changing the emission angle of the emerging light (diffused light) depending on the incidence angle of the laser beam L as will be explained later.

Such an optical path adjustment element 16 can be formed by a condensing optical element such as a convex lens, for example. The arrangement position of the light diffusion element 18 can be determined based on a position (imaging position) at which light (diverging beam) from a point source of light placed at the position of the optical scan unit 14 is condensed via the optical path adjustment element 16. In this case, the arrangement positions of the light diffusion element 18 is desired to coincide with such an imaging position, but does not necessarily have to strictly coincide with such an imaging position. Thus, the light diffusion element 18 may be placed in a range (e.g., range in the vicinity of the imaging position) in which the incidence of the laser beam L from the optical path adjustment element 16 on the particular range Rs on the light diffusion element 18 is possible.

The light diffusion element 18 receives the laser beam L incident on the particular range Rs from the optical path adjustment element 16, diffuses the laser beam L, and emits diffused light having directivity. The emission angle of the diffused light emerging from the light diffusion element 18 varies depending on the incidence angle of the laser beam L on the light diffusion element 18. For example, in the example shown in FIG. 1, the "first laser beam L1 vertically incident on the light diffusion element 18 at an incidence angle ($\theta i1$) of 0 degrees," the "second laser beam L2 whose incidence angle ($\theta i2$) on the light diffusion element 18 differs from that of the first laser beam L1" and the "third laser beam L3 whose incidence angle ($\theta i3$) on the light diffusion element 18 differs from those of the first laser beam L1 and the second laser beam L2" are diffused by the light diffusion element 18 into "first diffused light D1," "second diffused light D2" and "third diffused light D3" that respectively illuminate different regions. Incidentally, in this embodiment, a "region occupied by diffused light" and a "region momentarily illuminatable by diffused light (illumination subregion)" are identical with each other. In the example shown in FIG. 1, an illumination subregion illuminatable by the first diffused light D1 is indicated as a first illumination subregion R1, an illumination subregion illuminatable by the second diffused light D2 is indicated as a second illumination subregion R2, and an illumination subregion illuminatable by the third diffused light D3 is indicated as a third illumination subregion R3.

The emission angle of the diffused light emerging from the light diffusion element 18 is defined according to any standard, and can be defined by an angle formed by an "emission angle reference line specifying the center of the traveling directions of the diffused light (see the reference characters "S1," "S2" and "S3" in FIG. 1)" and a "direction orthogonal to the exit surface of the light diffusion element 18," for example. In FIG. 1, the emission angle of the second diffused light D2 made from the second laser beam L2 is indicated by the reference character "$\theta d2$," the emission angle of the third diffused light D3 made from the third laser beam L3 is indicated by the reference character "$\theta d3$," and the emission angle ($\theta d1$) of the first diffused light D1 made from the first laser beam L1 is 0 degrees.

As above, the diffused light emerging from the light diffusion element 18 has directivity, and the light diffusion element 18 emits diffused light having a diffusion angle larger than a diffusion angle of the incident laser beam L. The diffusion angle of the laser beam L and the diffusion angle of the diffused light can be defined according to any standard, and may be defined based on an optical property such as light intensity, for example. Typically, an angular range exhibiting light intensity higher than or equal to 13%-50% of maximum light intensity (peak intensity value) can be defined as the diffusion angle of the light (laser beam L, diffused light). Thus, the diffusion angle of the light (laser beam L, diffused light) may be defined based on the full width at half maximum of the maximum light intensity or an angular range exhibiting light intensity higher than or equal to "$1/(e^2)(\approx13.5\%)$" of the maximum light intensity, for example.

Figure 2:
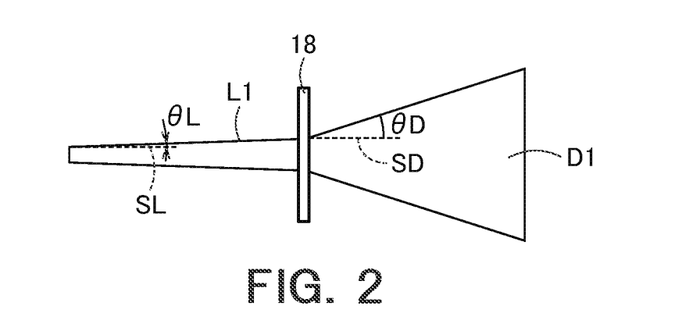
FIG. 2 is a conceptual diagram for explaining a diffusing function of a light diffusion element.

FIG. 2 is a conceptual diagram for explaining the diffusing function of the light diffusion element 18. The following explanation will be given of the first laser beam L1 vertically incident on the incidence surface of the light diffusion element 18 and the first diffused light D1 emerging from the light diffusion element 18 in the direction orthogonal to the exit surface of the light diffusion element 18 as an example. In this example, a diffusion angle reference line SL of the first laser beam L1 and a diffusion angle reference line SD of the first diffused light D1 extend in the same direction that is orthogonal to the incidence surface and the exit surface of the light diffusion element 18. Maximum broadening directions of the first laser beam L1 and the first diffused light D1 are defined based on parts specifying outermost parts of the first laser beam L1 and the first diffused light D1. In the example shown in FIG. 2, the diffusion angle of the first laser beam L1 is indicated by the reference character "$\theta L$" and the diffusion angle of the first diffused light D1 is indicated by the reference character "$\theta D$." Since the light diffusion element 18 in this embodiment emits diffused light having a diffusion angle larger than that of the incident laser beam L as mentioned above, a relationship $\theta L<\theta D$ holds in regard to the example shown in FIG. 2.

Incidentally, while the specific measurement method of the light diffusion angle is not particularly limited, the diffusion angle can be measured typically based on the following method: Specifically, a size corresponding to the width of light as the object of measurement at a certain position (hereinafter referred to also as a "first measurement position") will be represented as a "first size "a" of the light." Further, a size corresponding to the width of the light at a position on the downstream side of the first measurement position in regard to the traveling direction of the light by a distance l (hereinafter referred to also as a "second measurement position") will be represented as a "second size "b" of the light." The diffusion angle $\theta$ of light is expressed by "$\tan \theta=(b-a)/(2\times l)$" as a function of the "first size "a" of the light," the "second size "b" of the light" and the "distance l." Therefore, the diffusion angle $\theta$ of any kind of light can be acquired by measuring the "first size "a" of the light" at the first measurement position, the "second size "b" of the light" at the second measurement position, and the "distance l" between the first measurement position and the second measurement position. The "first size "a" of the light" and the "second size "b" of the light" can be measured by using a beam profiler. Specifically, in the aforementioned case where the angular range exhibiting light intensity higher than or equal to 13%-50% of the maximum light intensity (peak intensity value) is defined as the diffusion angle of the light (laser beam L, diffused light), it is possible to measure the width of the light (laser beam L, diffused light) higher than or equal to 13%-50% of the light intensity maximum value at intended measurement positions by using the beam profiler and determine the width as the size of the light.

In this embodiment, the region momentarily illuminatable (illumination subregion) is determined according to the diffusion angle of the diffused light emerging from the light diffusion element 18. Therefore, the diffusion angle of the diffused light emerging from the light diffusion element 18 is determined according to the angular range of the illumination subregion with reference to the light diffusion element 18 and the incidence area and the diffusion angle of the laser beam L incident on the light diffusion element 18.

While the specific configuration of the light diffusion element 18 having the above-described optical property is not particularly limited, the light diffusion element 18 is typically implemented by a hologram record medium. As another example, the light diffusion element 18 may include a lens array (microlens array) having a plurality of lenses (microlenses).

In general, let "λ" represent the wavelength of the laser beam (coherent light) L incident on a hologram, "α" represent the incidence angle of the laser beam on the hologram, "β" represent the emission angle (diffraction angle) of the laser beam from the hologram, and "p" represent the fine structure pitch (diffraction pitch) of the hologram, a relational expression "$\sin(\alpha) \pm \sin(\beta) = \lambda/p$" holds. Thus, in cases where the light diffusion element 18 includes a hologram, it is clear from the above relational expression that the emission angle β changes depending on the incidence angle α of the laser beam L since "λ/p" in the relational expression is constant if the fine structure pitch p of the hologram is constant and the wavelength λ of the laser beam L is constant.

The illumination device 10 having the configuration described above is capable of illuminating an intended region (illumination subregion) and is especially capable of selectively illuminating one or a plurality of illumination subregions by combining "on-off control of the emission of the laser beam L from the laser light source 12" and "control of the optical path adjustment of the laser beam L (scanning of the laser beam L) by the optical scan unit 14."

Figure 3:
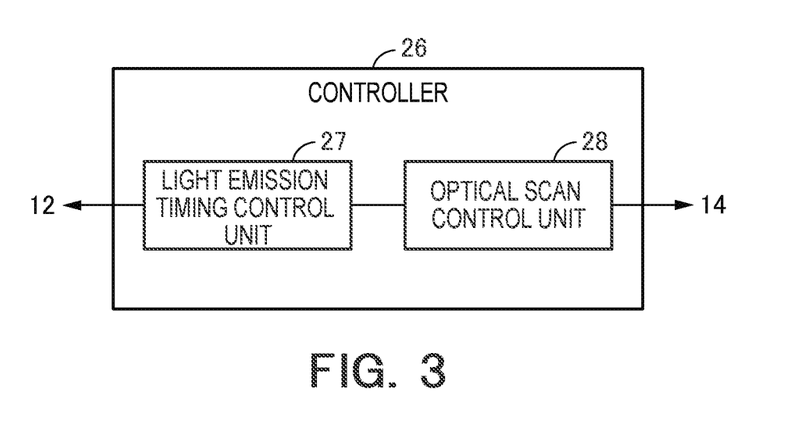
FIG. 3 is a block diagram showing an example of the functional configuration of a controller that controls a laser light source and an optical scan unit in an integrated manner.

FIG. 3 is a block diagram showing an example of the functional configuration of a controller 26 that controls the laser light source 12 and the optical scan unit 14 in an integrated manner. The controller 26 in this example is connected to the laser light source 12 and the optical scan unit 14. The controller 26 includes the light emission timing control unit 27 for controlling the laser light source 12 and the optical scan control unit 28 for controlling the optical scan unit 14.

The light emission timing control unit 27 works in cooperation with the optical scan control unit 28 and controls the emission timing of the laser beam L according to the scanning of the laser beam L by the optical scan unit 14. This makes it possible to selectively illuminate or not illuminate a partial region (illumination subregion) in the illumination region with the diffused light from the light diffusion element 18.

For example, in cases where the same illumination subregion is continuously illuminated with only one type of diffused light selected from the first diffused light D1, the second diffused light D2 and the third diffused light D3 in the example shown in FIG. 1, the light emission timing control unit 27 controls the laser light source 12 to make the laser beam L be continuously emitted from the laser light source 12, while the optical scan control unit 28 controls the optical scan unit 14 to fix the guide direction of the laser beam L by the optical scan unit 14 and to make the laser beam L be incident on the light diffusion element 18 at an angle corresponding to the illumination subregion as the illumination object.

In contrast, in cases where a plurality of illumination subregions are continuously illuminated with at least two types of diffused light selected from the first diffused light D1, the second diffused light D2 and the third diffused light D3, the optical scan control unit 28 controls the optical scan unit 14 to scan the laser beam L on the optical path adjustment element 16, while the light emission timing control unit 27 controls the laser light source 12 to control the emission timing of the laser beam L.

As explained above, the illumination subregion is determined by the range of the diffused light from the light diffusion element 18, and the range of the diffused light is determined by the incidence angle of the laser beam L on the light diffusion element 18. The incidence angle of the laser beam L on the light diffusion element 18 is determined by the incidence position of the laser beam L on the optical path adjustment element 16, and the incidence angle of the laser beam L on the optical path adjustment element 16 is determined by the guide direction of the laser beam L by the optical scan unit 14. Therefore, each illumination subregion is associated with each of the "guide direction of the laser beam L by the optical scan unit 14" and the "incidence position of the laser beam L on the optical path adjustment element 16," and the region illuminated by the diffused light from the light diffusion element 18 (illumination subregion) can be changed by changing the guide direction of the laser beam L by using the optical scan unit 14. Thus, in cases where a plurality of illumination subregions are continuously illuminated as described above, it is sufficient if the laser beam L is made to be continuously incident on "incidence positions of the laser beam L on the optical path adjustment element 16 associated with the plurality of illumination subregions as the illumination object" (hereinafter referred to also as "illumination object incidence positions").

Therefore, the controller 26 (the light emission timing control unit 27 and the optical scan control unit 28) controls the laser light source 12 and the optical scan unit 14 and makes the optical scan unit 14 change the traveling direction of the laser beam L from the laser light source 12 with the passage of time, while setting the laser beam emission from the laser light source 12 on at times when the scanning position of the laser beam L corresponds to the aforementioned "illumination object incidence position" and setting the laser beam emission from the laser light source 12 off at times when the scanning position of the laser beam L does not correspond to the "illumination object incidence position." With such features, it is possible to make the laser beam from the optical scan unit 14 be continuously incident exclusively on the illumination object incidence positions on the optical path adjustment element 16 and continuously illuminate the intended plurality of illumination subregions with the diffused light emerging from the light diffusion element 18.

Incidentally, the method of the scanning of the laser beam L by the optical scan unit 14 is not particularly limited. It is possible to employ the raster scan method or the Lissajous scan method, for example. Further, the method of demarcating each illumination subregion in the illumination region is not particularly limited. The region momentarily illuminatable by the diffused light from the light diffusion element 18 is determined as the illumination subregion. Thus, each illumination subregion is determined according to the "incidence angle of the laser beam L on the light diffusion element 18" and the "emission angle of the laser beam L from the light diffusion element 18" indirectly controlled by the optical scan unit 14. Therefore, the illumination subregions may be set so that the illumination subregions (the first illumination subregion R1, the second illumination subregion R2 and the third illumination subregion R3) do not overlap with each other as shown in FIG. 1, for example, or so that the illumination subregions overlap with each other, or there may exist illumination subregions overlapping with each other and illumination subregions not overlapping with each other in the illumination region.

Incidentally, each illumination region (illumination subregion) illuminated by the diffused light from the light diffusion element 18 gradually increases in size according to the diffusion angle of the diffused light with the increase in the distance from the light diffusion element 18. Thus, each illumination region (illumination subregion) illuminated by the illumination device 10 is a broader region at a position relatively far from the light diffusion element 18 (far field) than at a position relatively close from the light diffusion element 18 (near field). Therefore, it is often convenient to express the size of the illumination subregion by angular distribution in an angular space rather than by the actual dimensions of the illumination subregion. The term "illumination region" in this description can include an angular range of the illumination region in an angular space in addition to the actual irradiation object area and illumination range.

Figure 4:
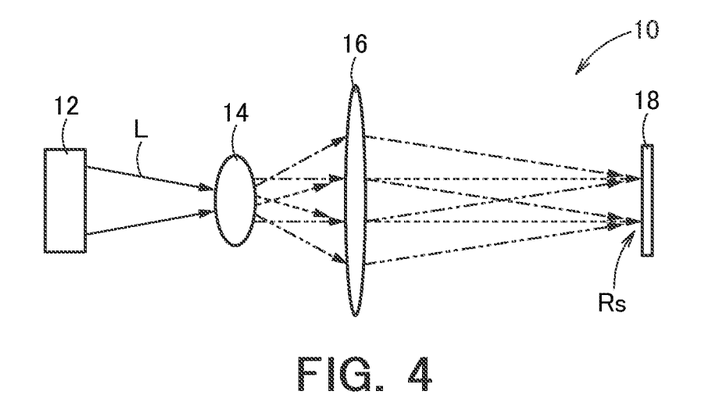
FIG. 4 is a conceptual diagram schematically showing an example of the change in the beam diameter of a laser beam in an illumination device having the same configuration as the embodiment shown in FIG. 1.

FIG. 4 is a conceptual diagram schematically showing an example of the change in the beam diameter of the laser beam L in an illumination device 10 having the same configuration as the embodiment shown in FIG. 1. In FIG. 4, the beam diameter of the laser beam L is conceptually indicated by solid lines, dotted lines, chain lines and two-dot chain lines. The laser beam L emitted from the laser light source 12 shown in FIG. 4 gradually decreases in the beam diameter as the beam travels towards the optical scan unit 14. The beam diameter of the laser beam L traveling from the optical scan unit 14 towards the optical path adjustment element 16 also changes. In the example shown in FIG. 4, the beam diameter of the laser beam L just before entering the optical path adjustment element 16 is larger than the beam diameter of the laser beam L just after emerging from the optical scan unit 14. Then, the laser beam L is collimated by the optical path adjustment element 16, travels from the optical path adjustment element 16 towards the light diffusion element 18 while maintaining a substantially constant beam diameter, and is guided to the particular range Rs on the light diffusion element 18.

In general, when the intensity of the laser beam L emitted from the laser light source 12 is constant, with the increase in the beam diameter of the laser beam L, the energy density of the laser beam L decreases and the safety for human eyes improves, for example. In the aforementioned illumination device 10 shown in FIG. 4, the laser beam L after undergoing the collimation after the enlargement of the beam diameter is incident on the light diffusion element 18. By the adjustment for enlarging the beam diameter of the laser beam L, the safety can be improved. Further, thanks to the incidence of the collimated laser beam L on the light diffusion element 18, the blurring of the light emerging from the light diffusion element 18 can be reduced.

As explained above, while the laser beam L emitted from the laser light source 12 is guided in various directions by the optical scan unit 14, the laser beam L is thereafter guided by the optical path adjustment element 16 to the particular range Rs on the light diffusion element 18. Therefore, the incidence angle of the laser beam L on the light diffusion element 18 varies depending on the guide direction of the laser beam L by the optical scan unit 14, and the optical scan unit 14 is capable of indirectly controlling the incidence angle of the laser beam L on the light diffusion element 18. By making the optical scan unit 14 control the angle of the laser beam L incident on the light diffusion element 18, it is possible to make the light diffusion element 18 emit the diffused light for illumination in various directions and to illuminate a plurality of illumination regions (illumination subregions) by using a single light diffusion element 18.

Therefore, with the illumination device 10 according to this embodiment, a plurality of illumination subregions can be illuminated appropriately while configuring the light diffusion element 18 simply and compactly, without the need of providing as many light diffusion elements (hologram regions or the like) 18 as the illumination object regions (illumination subregions).

<Modifications>

The present invention is not limited to the above-described embodiment; other modifications may be made.

Figure 5:
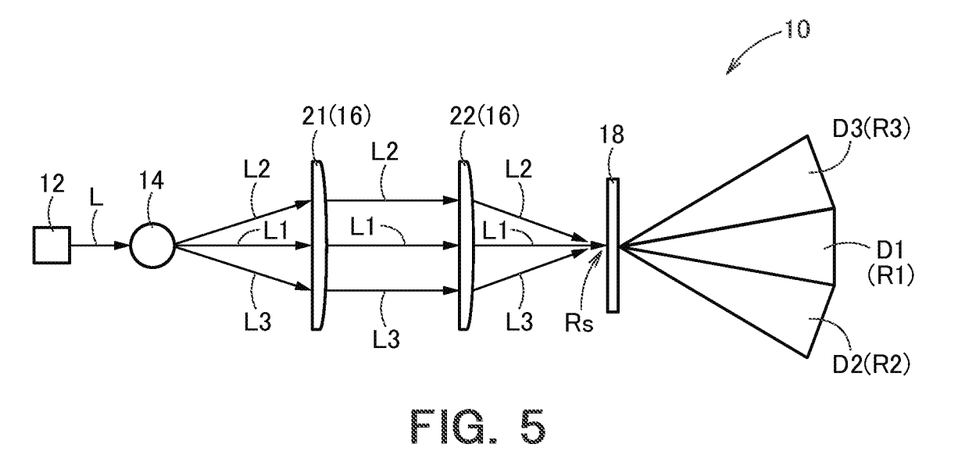
FIG. 5 is a conceptual diagram showing a modification of the illumination device.

For example, the optical path adjustment element 16 may either be formed of a single optical element or a plurality of optical elements. FIG. 5 is a conceptual diagram showing a modification of the illumination device 10. While the optical path adjustment element 16 formed of a single optical element is shown in FIG. 1, the optical path adjustment element 16 may be formed of a plurality of optical elements including a collimating optical element 21 and a condensing optical element 22, for example, as in the modification shown in FIG. 5. In this modification, the laser beam from the optical scan unit 14 (see the first laser beam L1, the second laser beam L2 and the third laser beam L3 shown in FIG. 5) is collimated by the collimating optical element 21. The laser beam L collimated by the collimating optical element 21 is guided by the condensing optical element 22 to the particular range Rs on the light diffusion element 18. By making the laser beam L be incident on the particular range Rs on the light diffusion element 18 after once collimating the laser beam L as above, the degree of freedom of the selection of the optical element(s) forming the optical path adjustment element 16 is increased and the arrangement position of the light diffusion element 18 can be adjusted flexibly.

Figure 6:
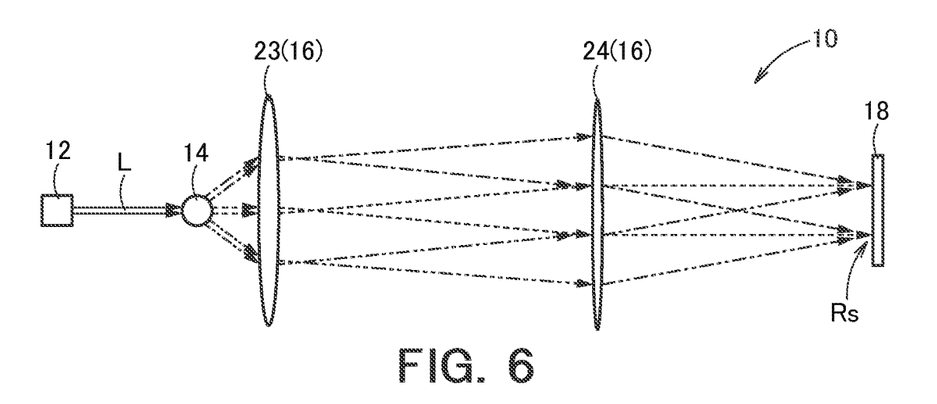
FIG. 6 is a conceptual diagram schematically showing an example of the change in the beam diameter of the laser beam in the modification of the illumination device shown in FIG. 5.

FIG. 6 is a conceptual diagram schematically showing an example of the change in the beam diameter of the laser beam L in the modification of the illumination device 10 shown in FIG. 5. In FIG. 6, the beam diameter of the laser beam L is conceptually indicated by solid lines, dotted lines, chain lines and two-dot chain lines. The laser beam L emitted from the laser light source 12 shown in FIG. 6 has a substantially constant beam diameter, and the beam diameter of the laser beam L traveling from the optical scan unit 14 towards the optical path adjustment element 16 is also substantially constant. In the example shown in FIG. 6, the optical path adjustment element 16 is formed of a beam diameter adjustment element 23 and a collimating optical element 24. The laser beam L from the optical scan unit 14 is incident on the beam diameter adjustment element 23. The laser beam L emerging from the beam diameter adjustment element 23 is incident on the collimating optical element 24. The laser beam L emerging from the collimating optical element 24 is incident on the light diffusion element 18. The beam diameter adjustment element 23 adjusts the beam diameter of the laser beam L so that the beam diameter gradually changes along with the travel of the laser beam L, by which the beam diameter of the laser beam L incident on the collimating optical element 24 becomes larger than the beam diameter of the laser beam L incident on the beam diameter adjustment element 23. The collimating optical element 24 collimates the laser beam L and guides the collimated laser beam L to the light diffusion element 18.

As above, the optical path adjustment element 16 formed of the beam diameter adjustment element 23 and the collimating optical element 24 makes the beam diameter of the laser beam L emerging from the optical path adjustment element 16 (specifically, the collimating optical element 24) larger than the beam diameter of the laser beam L incident on the optical path adjustment element 16 (specifically, the beam diameter adjustment element 23). Also in the illumination device 10 shown in FIG. 6, the laser beam L after undergoing the collimation after the enlargement of the beam diameter is incident on the light diffusion element 18 as above. Therefore, the blurring of the light emerging from the light diffusion element 18 can be reduced while improving the safety.

Figure 7:
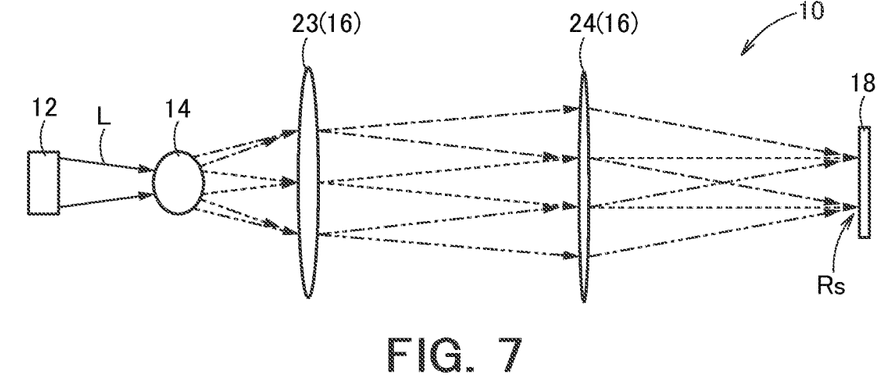
FIG. 7 is a conceptual diagram schematically showing an example of the change in the beam diameter of the laser beam in the modification of the illumination device shown in FIG. 6.

FIG. 7 is a conceptual diagram schematically showing an example of the change in the beam diameter of the laser beam L in the modification of the illumination device 10 shown in FIG. 6. In FIG. 7, the beam diameter of the laser beam L is conceptually indicated by solid lines, dotted lines, chain lines and two-dot chain lines. Also in the illumination device 10 shown in FIG. 7, the optical path adjustment element 16 is formed of the beam diameter adjustment element 23 and the collimating optical element 24 as in the illumination device 10 shown in FIG. 6. However, the beam diameter of the laser beam L emitted from the laser light source 12 gradually changes and decreases as the laser beam L travels towards the optical scan unit 14. The beam diameter of the laser beam L traveling from the optical scan unit 14 towards the optical path adjustment element 16 also changes. In the example shown in FIG. 7, the beam diameter of the laser beam L just before entering the optical path adjustment element 16 (specifically, the beam diameter adjustment element 23) is smaller than the beam diameter of the laser beam L just after emerging from the optical scan unit 14. The beam diameter adjustment element 23 adjusts the beam diameter of the laser beam L so that the beam diameter gradually changes along with the travel of the laser beam L, by which the beam diameter of the laser beam L incident on the collimating optical element 24 becomes larger than the beam diameter of the laser beam L incident on the beam diameter adjustment element 23. Then, the collimating optical element 24 collimates the laser beam L and guides the collimated laser beam L to the light diffusion element 18.

Also in the illumination device 10 shown in FIG. 7, the optical path adjustment element 16 adjusts the beam diameter of the laser beam L so that the beam diameter of the laser beam L emerging from the optical path adjustment element 16 (specifically, the collimating optical element 24) becomes larger than the beam diameter of the laser beam L incident on the optical path adjustment element 16 (specifically, the beam diameter adjustment element 23). As above, the laser beam L after undergoing the collimation after the enlargement of the beam diameter is incident on the light diffusion element 18. Accordingly, the blurring of the light emerging from the light diffusion element 18 can be reduced while improving the safety.

Incidentally, the laser beam L emitted from the laser light source 12 may either contain a light component of a single wavelength or a plurality of light components having wavelengths different from each other.

Figure 8:
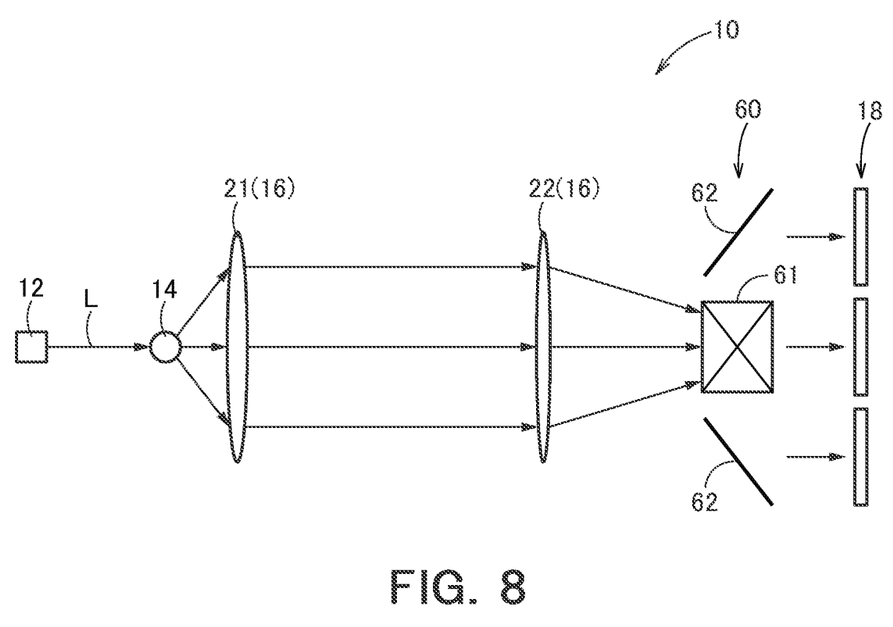
FIG. 8 is a conceptual diagram showing the general configuration of an illumination device according to another modification.

FIG. 8 is a conceptual diagram showing the general configuration of an illumination device 10 according to another modification. In this embodiment, components identical or similar to those in the aforementioned illumination device 10 shown in FIG. 5 are assigned the same reference characters as in FIG. 5 and detailed explanation thereof is omitted for brevity.

In the illumination device 10 shown in FIG. 8, the laser beam L emitted from the laser light source 12 and undergoing the change of the optical path by the optical scan unit 14 contains light components having wavelengths different from each other. Further, a spectroscopic unit 60 is provided between the optical path adjustment element 16 (specifically, the condensing optical element 22) and the light diffusion element 18. The laser beam L from the optical path adjustment element 16 is incident on the light diffusion element 18 via the spectroscopic unit 60. The spectroscopic unit 60 spectrally disperses the laser beam L from the optical path adjustment element 16 into a plurality of light components having wavelengths different from each other and emits the plurality of light components towards the light diffusion element 18.

The spectroscopic unit 60 shown in FIG. 8 includes a first spectroscopic guide member 61 and a second spectroscopic guide member 62. The first spectroscopic guide member 61 includes a dichroic mirror that allows a light component in a first wavelength range to pass therethrough and guides the light component to the light diffusion element 18 while reflecting light components in the other wavelength ranges. The second spectroscopic guide member 62 guides the light components in the other wavelength ranges reflected by the dichroic mirror of the first spectroscopic guide member 61 to the light diffusion element 18. The light components differing in the wavelength guided by the first spectroscopic guide member 61 and the second spectroscopic guide member 62 are guided to different parts of the light diffusion element 18, and are respectively incident on corresponding light diffusion elements 18 each formed of a hologram, for example. Then, each light component is diffused by the corresponding light diffusion element 18.

In cases where the laser beam L from the laser light source 12 includes a light component in a red wavelength range, a light component in a green wavelength range and a light component in a blue wavelength range, for example, the laser beam L incident on the spectroscopic unit 60 is separated into the light components in the wavelength ranges. Then, the light component in the red wavelength range is guided by the spectroscopic unit 60 to be incident on a light diffusion element 18 optimized for the light component in the red wavelength range. Similarly, the light component in the green wavelength range and the light component in the blue wavelength range are also guided by the spectroscopic unit 60 to be respectively incident on light diffusion elements 18 optimized for the light components. Incidentally, also in this modification, the timing of the emission of the laser beam L from the laser light source 12 is controlled by the controller 26 in regard to each light component in the respective wavelength range in conjunction with the scan control of the optical scan unit 14. Thus, it is also possible to illuminate an intended illumination subregion with full-color light by using a laser light source 12 capable of emitting a laser beam L containing a light component of a red wavelength, a light component of a green wavelength and a light component of a blue wavelength.

The specific configuration of the optical path adjustment element 16 is not limited as long as the laser beam L from the optical scan unit 14 can be guided to the particular range Rs on the light diffusion element 18. For example, the optical path adjustment element 16 may be formed by one or a combination of a lens (e.g., convex lens) and a reflecting mirror (e.g., concave mirror). Further, the components of the illumination device 10 do not necessarily have to be arranged on the same plane; the components can be set at various positions in a three-dimensional space.

While examples in which the laser beam L from the optical path adjustment element 16 is allowed through and diffused by the light diffusion element 18 are shown in FIG. 1 and FIG. 5, the light diffusion element 18 may also be an element that causes diffuse reflection to the laser beam L. For example, in cases where a hologram record medium is used as the light diffusion element 18, the hologram record medium may either be of the reflective type or the transmissive type. In such cases where a hologram record medium is used as the light diffusion element 18, the specific structure of the hologram record medium is not particularly limited and the hologram record medium can be an embossment type hologram record medium having concavities and convexities on its surface, or a volume type hologram record medium made of a stack of layers having various refractive indices, for example. Both of the embossment type hologram record medium and the volume type hologram record medium are capable of forming a reflective type hologram record medium and forming a transmissive type hologram record medium. Each hologram record medium has characteristics corresponding to the type (reflective/transmissive type, embossment/volume type). For example, in regard to wavelength selectivity, the volume type hologram record media are often more advantageous than the embossment type hologram record media. Therefore, it is desirable to form the light diffusion element 18 by using a hologram record medium of the optimum type selected based on the specific conditions of use.

Incidentally, the objects of application of the illumination device 10 described above are not particularly limited. For example, the illumination device 10 can be mounted on a vehicle, an aircraft such as an airplane, a means of transportation such as a train, marine vessel or submarine, or a different type of moving object, or can be installed in a specified place.

Modes of the present invention are not limited to the individual embodiments described above but contain a variety of modifications conceivable by those skilled in the art, and effects of the present invention are also not limited to those described above. Namely, various additions, changes and partial deletions are possible within the range not departing from the conceptual idea and content of the present invention derived from the contents specified in the claims and equivalents thereof.

REFERENCE SIGNS LIST

10: Illumination device
12: Laser light source
14: Optical scan unit
16: Optical path adjustment element
18: Light diffusion element
21: Collimating optical element
22: Condensing optical element
26: Controller
27: Light emission timing control unit
28: Optical scan control unit
60: Spectroscopic unit
61: First spectroscopic guide member
62: Second spectroscopic guide member

What is claimed is:

1. An illumination device comprising:
a coherent light source which emits a coherent light;
an optical scan unit which is capable of changing an optical path of the coherent light from the coherent light source;
an optical path adjustment element on which the coherent light from the optical scan unit is incident, an incidence position of the coherent light on the optical path adjustment element varying depending on the optical path determined by the optical scan unit, an emission angle of the coherent light of the optical path adjustment element varying depending on the incidence position; and
a light diffusion element on which the coherent light from the optical path adjustment element is incident, the light diffusion element diffusing the coherent light and emitting diffused light, an emission angle of the diffused light varying depending on an incidence angle of the coherent light, wherein
the optical path adjustment element makes the coherent light be incident on a particular range of the light diffusion element irrespective of the incidence position of the coherent light from the optical scan unit,
a plurality of illumination regions can be selectively illuminated with the diffused light emerging from the light diffusion element, and
one of the illumination regions is changed depending on the incidence position of the coherent light on the optical path adjustment element.

2. The illumination device as defined in claim 1, wherein the light diffusion element emits the diffused light having a diffusion angle larger than a diffusion angle of the coherent light incident thereon.

3. The illumination device as defined in claim 1, wherein the optical path adjustment element is formed of a single optical element.

4. The illumination device as defined in claim 1, wherein the optical path adjustment element is formed of a plurality of optical elements.

5. The illumination device as defined in claim 4, wherein the optical path adjustment element includes a collimating optical element and a condensing optical element.

6. The illumination device as defined in claim 1, wherein the light diffusion element is a hologram record medium.

7. The illumination device as defined in claim 1, wherein the light diffusion element includes a lens array having a plurality of lenses.

8. The illumination device as defined in claim 1, wherein the optical path adjustment element makes a beam diameter of the coherent light emitted from the optical path adjustment element larger than a beam diameter of the coherent light incident on the optical path adjustment element.

9. The illumination device as defined in claim 1, wherein a beam diameter of the coherent light traveling from the optical scan unit towards the optical path adjustment element is constant.

10. The illumination device as defined in claim 1, wherein a beam diameter of the coherent light traveling from the optical scan unit towards the optical path adjustment element changes.

11. An illumination device comprising:
a coherent light source which emits a coherent light;
an optical scan unit which is capable of changing an optical path of the coherent light from the coherent light source;

an optical path adjustment element on which the coherent light from the optical scan unit is incident, an incidence position of the coherent light on the optical path adjustment element varying depending on the optical path determined by the optical scan unit, an emission angle of the coherent light of the optical path adjustment element varying depending on the incidence position; and a light diffusion element on which the coherent light from the optical path adjustment element is incident, the light diffusion element diffusing the coherent light and emitting diffused light, an emission angle of the diffused light varying depending on an incidence angle of the coherent light, wherein:

the coherent light whose optical path is changed by the optical scan unit contains light components having wavelengths different from each other, a spectroscopic unit is provided between the optical path adjustment element and the light diffusion element, the coherent light from the optical path adjustment element is incident on the light diffusion element via the spectroscopic unit, and the spectroscopic unit spectrally disperses the coherent light from the optical path adjustment element into a plurality of light components having wavelengths different from each other and emits the plurality of light components towards the light diffusion element.

12. The illumination device as defined in claim 11, wherein the spectroscopic unit includes:

a first spectroscopic guide member that allows a light component in a first wavelength range to pass therethrough and guides the light component to the light diffusion element while reflecting light components in other wavelength ranges; and a second spectroscopic guide member that guides the light components in the other wavelength ranges reflected by the first spectroscopic guide member to the light diffusion element.

* * * * *